(12) United States Patent
Kerns et al.

(10) Patent No.: US 10,385,731 B2
(45) Date of Patent: *Aug. 20, 2019

(54) CTE MATCHING HANGER SUPPORT FOR CMC STRUCTURES

(71) Applicant: General Electric Company, Schenectady, NY (US)

(72) Inventors: Daniel Patrick Kerns, Mason, OH (US); Mark Eugene Noe, West Chester, OH (US); Dennis Paul Dry, Cincinnati, OH (US); Brandon ALlanson Reynolds, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 15/620,134

(22) Filed: Jun. 12, 2017

(65) Prior Publication Data
US 2018/0355760 A1    Dec. 13, 2018

(51) Int. Cl.
| | |
|---|---|
| *F01D 9/04* | (2006.01) |
| *F01D 25/24* | (2006.01) |
| *F23R 3/60* | (2006.01) |
| *F23R 3/00* | (2006.01) |

(Continued)

(52) U.S. Cl.
CPC .......... *F01D 25/246* (2013.01); *F01D 25/28* (2013.01); *F23R 3/002* (2013.01); *F23R 3/50* (2013.01);
(Continued)

(58) Field of Classification Search
CPC .... F02C 3/14; F02C 3/145; F02C 3/16; F02C 5/02; F02C 5/04; F02C 7/22; F02C 7/24; F23R 3/007; F23R 3/002; F23R 3/02; F23R 3/10; F23R 3/14; F23R 3/16; F23R 3/346; F23R 3/42; F23R 3/425; F23R 3/44; F23R 3/46; F23R 3/50; F23R 3/52; F23R 3/54; F23R 3/60; F23R 2900/00017; F23R 2900/00018; F05D 2220/32; F05D 2230/23; F05D 2230/232; F05D 2230/233;
(Continued)

(56) References Cited

U.S. PATENT DOCUMENTS

| | | |
|---|---|---|
| 4,395,195 A | 7/1983 | DeCosmo et al. |
| 4,990,056 A | 2/1991 | McClain et al. |

(Continued)

OTHER PUBLICATIONS

U.S. Appl. No. 15/417,399, filed Jan. 27, 2017.
U.S. Appl. No. 15/417,437, filed Jan. 27, 2017.
U.S. Appl. No. 15/417,602, filed Jan. 27, 2017.

*Primary Examiner* — Jason H Duger
(74) *Attorney, Agent, or Firm* — Dority & Manning, P.A.

(57) ABSTRACT

A flow path assembly for a gas turbine engine is provided. The flow path assembly may include an outer casing comprising a metal material having a first coefficient of thermal expansion, a ceramic structure comprising a ceramic material having a second coefficient of thermal expansion, and a mounting component attached on a first end to the outer casing and attached on a second end to the ceramic structure. The mounting component may be constructed from at least two materials transitioning from the first end to the second end such that the coefficient of thermal expansion is different at the first end than the second end.

18 Claims, 9 Drawing Sheets

(51) Int. Cl.
 *F01D 25/28* (2006.01)
 *F23R 3/50* (2006.01)
(52) U.S. Cl.
 CPC ............ *F23R 3/60* (2013.01); *F05D 2220/32* (2013.01); *F05D 2300/177* (2013.01); *F05D 2300/50212* (2013.01); *F05D 2300/6033* (2013.01); *F23R 2900/00018* (2013.01)
(58) Field of Classification Search
 CPC ......... F05D 2230/234; F05D 2230/235; F05D 2230/236; F05D 2230/237; F05D 2230/238; F05D 2230/239; F05D 2230/50; F05D 2230/60; F05D 2240/35; F05D 2300/20–2291; F05D 2300/6033; F05D 2300/50212; F05D 2300/177; F01D 5/06; F01D 5/143; F01D 5/18; F01D 5/225; F01D 5/282; F01D 5/284; F01D 9/02; F01D 9/023; F01D 9/026; F01D 9/04; F01D 9/041; F01D 9/044; F01D 9/047; F01D 9/06; F01D 9/042; F01D 9/07; F01D 11/02; F01D 11/04; F01D 11/005; F01D 25/12; F01D 25/24; F01D 25/243; F01D 25/246; F01D 25/28; Y02T 50/672
 See application file for complete search history.

(56) References Cited

U.S. PATENT DOCUMENTS

| | | | | |
|---|---|---|---|---|
| 5,562,408 | A * | 10/1996 | Proctor | F01D 11/24 415/173.1 |
| 6,200,092 | B1 | 3/2001 | Koschier | |
| 6,524,065 | B2 | 2/2003 | Briesenick et al. | |
| 6,530,744 | B2 * | 3/2003 | Liotta | F01D 9/041 415/115 |
| 6,851,263 | B2 * | 2/2005 | Stumpf | F23R 3/002 60/750 |
| 7,234,306 | B2 * | 6/2007 | Aumont | F23R 3/007 60/753 |
| 7,249,462 | B2 * | 7/2007 | Aumont | F01D 9/023 415/209.3 |
| 7,546,743 | B2 | 6/2009 | Bulman et al. | |
| 9,308,708 | B2 | 4/2016 | Kleinow | |
| 2004/0118122 | A1 * | 6/2004 | Mitchell | F23R 3/007 60/752 |
| 2010/0139847 | A1 | 6/2010 | Law et al. | |
| 2015/0308277 | A1 | 10/2015 | Verhelst | |
| 2015/0377061 | A1 | 12/2015 | Boeck | |
| 2016/0032778 | A1 | 2/2016 | Sanchez | |
| 2017/0058778 | A1 * | 3/2017 | Bloom | F23R 3/007 |

* cited by examiner

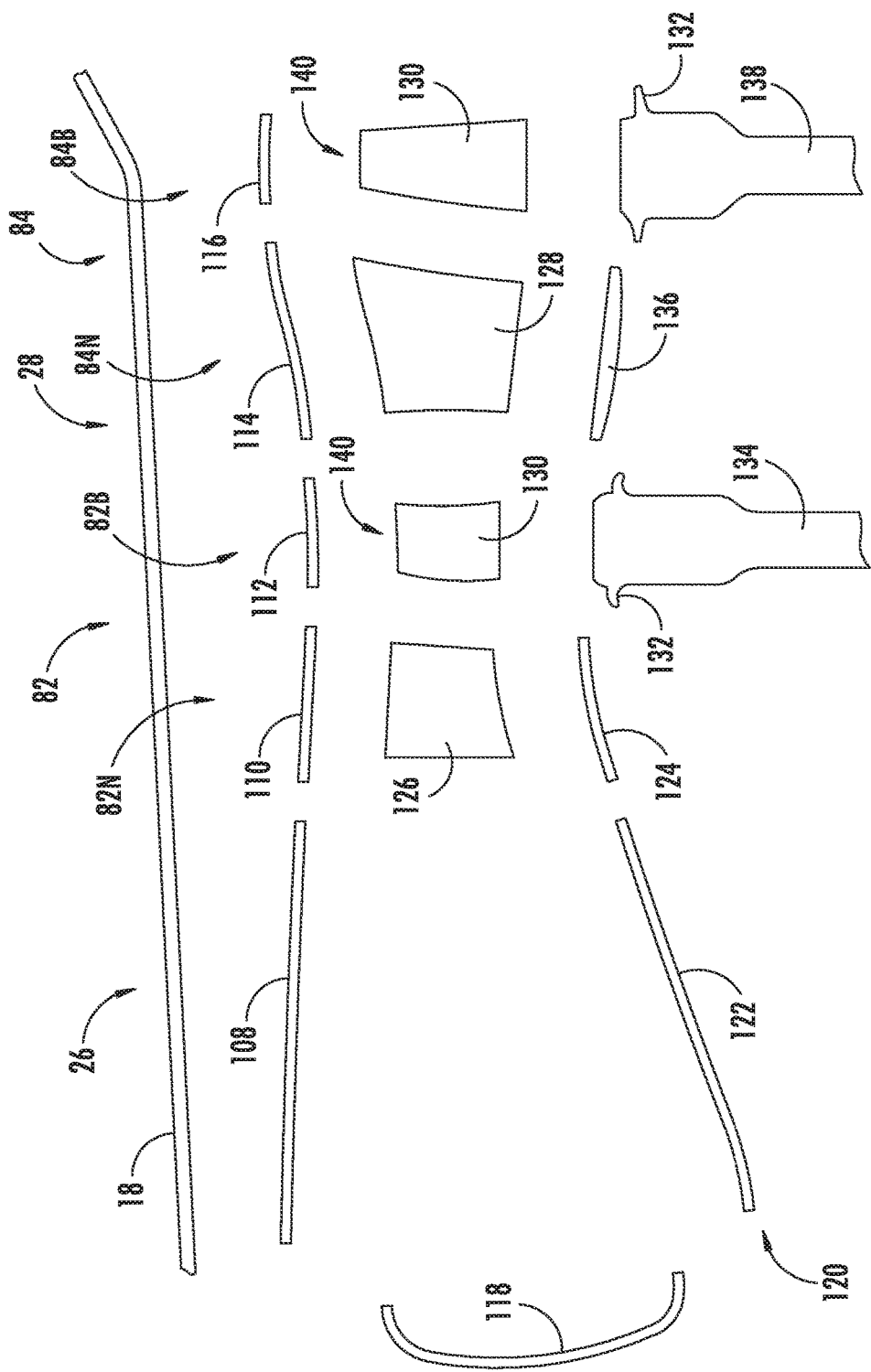

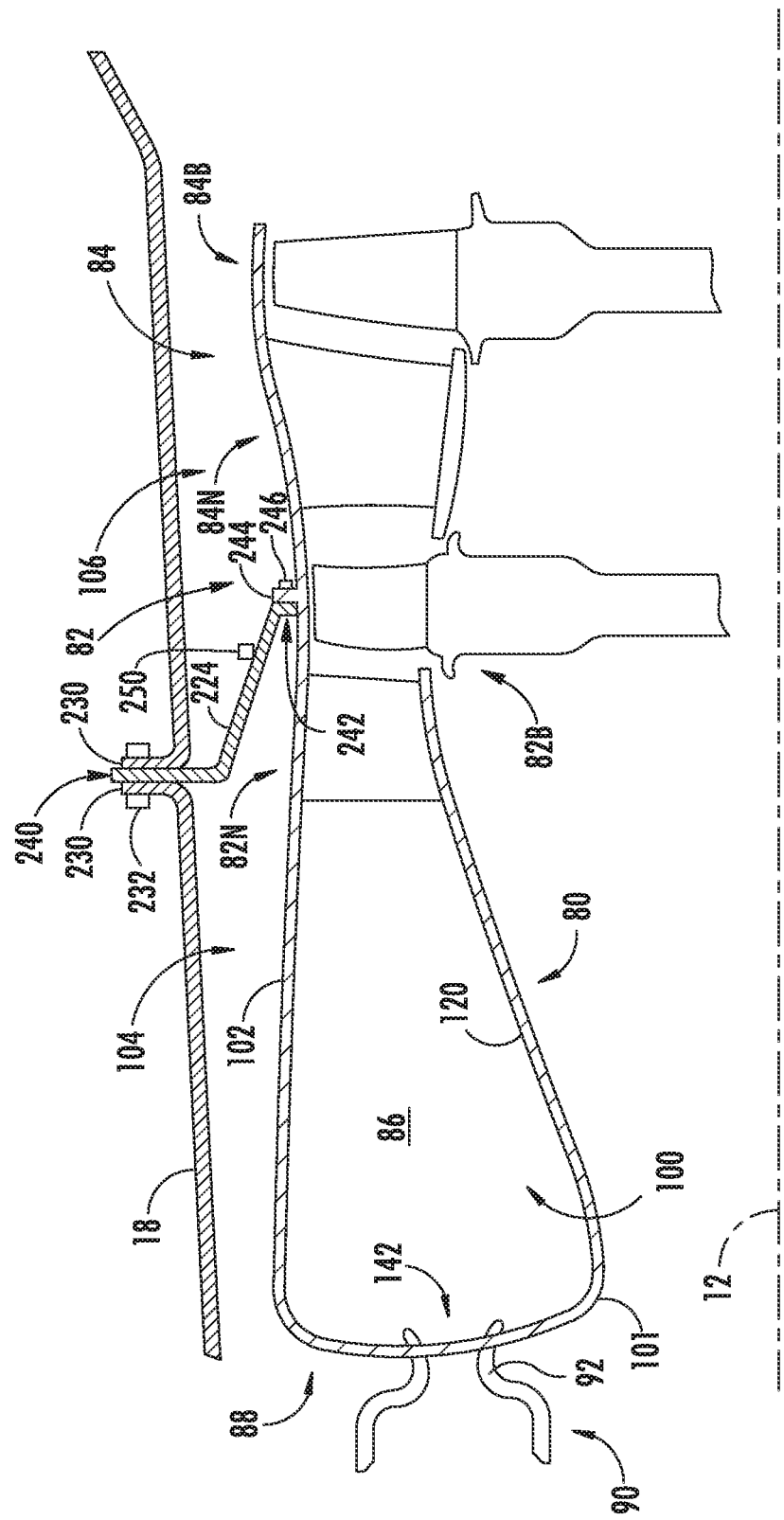

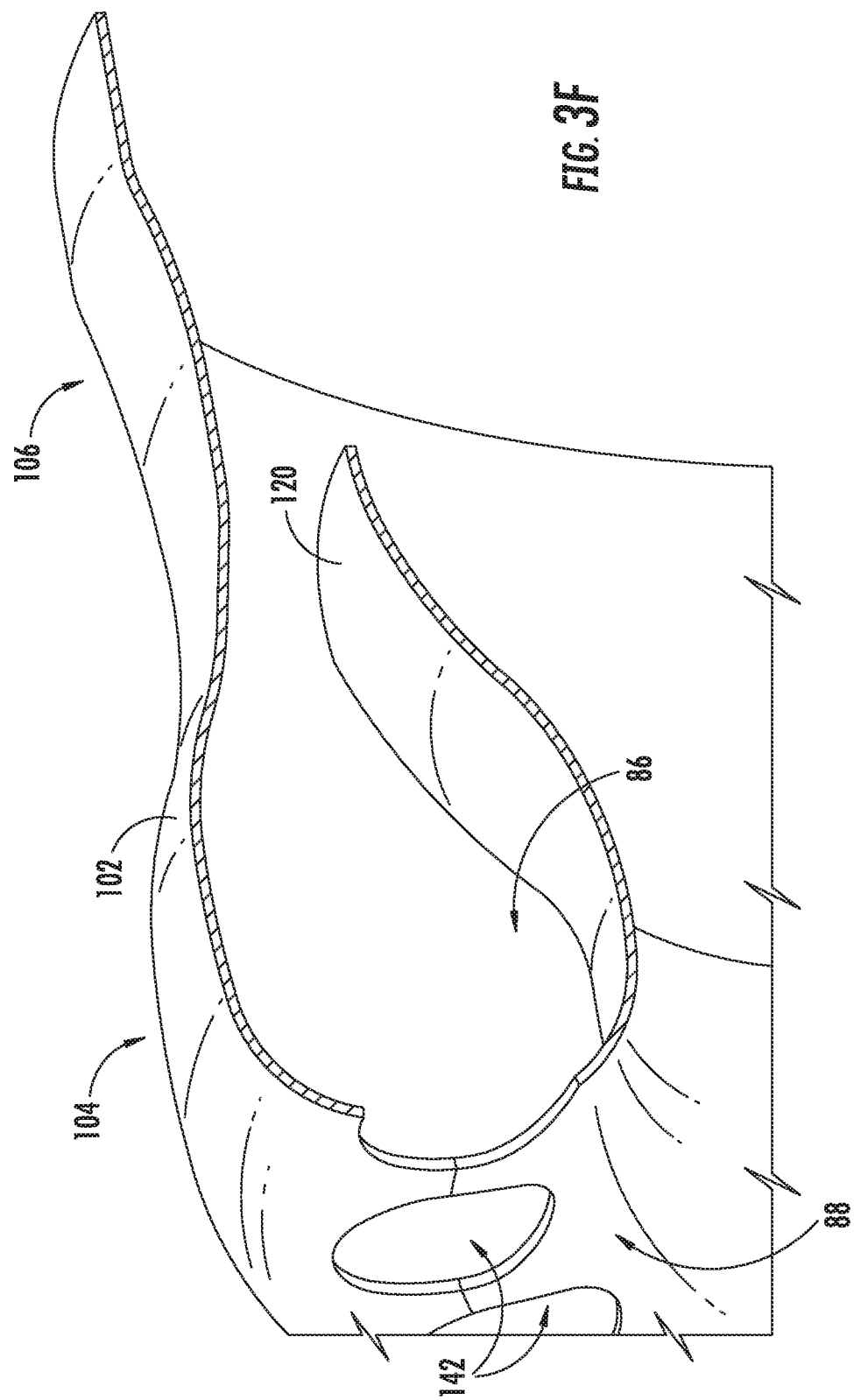

CTE MATCHING HANGER SUPPORT FOR CMC STRUCTURES

FIELD

The present subject matter relates generally to gas turbine engines. More particularly, the present subject matter relates to flow path assemblies of gas turbine engines and features for positioning a flow path assembly within a gas turbine engine.

BACKGROUND

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

Higher operating temperatures for gas turbine engines are continuously sought in order to increase their efficiency. Though significant advances in high temperature capabilities have been achieved through formulation of iron, nickel and cobalt-base superalloys, alternative materials have been investigated. CMC materials are a notable example because their high temperature capabilities can significantly reduce cooling air requirements. CMC materials generally comprise a ceramic fiber reinforcement material embedded in a ceramic matrix material. The reinforcement material may be discontinuous short fibers dispersed in the matrix material or continuous fibers or fiber bundles oriented within the matrix material, and serves as the load-bearing constituent of the CMC. In turn, the ceramic matrix protects the reinforcement material, maintains the orientation of its fibers, and serves to distribute loads to the reinforcement material.

As certain components are made with a CMC material within the hot gas path of a turbine engine, such as a shroud (e.g., a ring of material surrounding the rotating blades in the turbine section), a thermal mismatch may be introduced between the CMC component and other metal components. That is, the CMC component has a relatively low CTE compared to other metal parts. Thus, the CMC component is much less prone to thermal expansion and contraction during use, compared to metal components of the engine.

As such, a need exists to compensate for the thermal mismatch of the CMC components and the metal components within the gas turbine engine.

BRIEF DESCRIPTION

Aspects and advantages will be set forth in part in the following description, or may be obvious from the description, or may be learned through practice of the invention.

A flow path assembly is generally provided for a gas turbine engine. In one embodiment, the flow path assembly comprises: an outer casing comprising a metal material having a first coefficient of thermal expansion, a ceramic structure comprising a ceramic material having a second coefficient of thermal expansion, and a mounting component attached on a first end to the outer casing and attached on a second end to the ceramic structure. The mounting component is, in one embodiment, constructed from at least two materials transitioning from the first end to the second end such that the coefficient of thermal expansion is different at the first end than the second end.

Such a flow path assembly may be particularly useful when the ceramic structure is a unitary outer wall that includes a combustor portion extending through a combustion section of the gas turbine engine and a turbine portion extending through at least a first turbine stage of a turbine section of the gas turbine engine. For example, the combustor portion and the turbine portion being integrally formed as a single unitary structure.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 2 provides a schematic exploded cross-section view of a combustion section and a high pressure turbine section of the gas turbine engine of FIG. 1 according to an exemplary embodiment of the present subject matter;

FIGS. 3B, 3C, 3D, and 3E provide schematic cross-section views of the combustion section and high pressure turbine section of FIG. 2 according to other exemplary embodiments of the present subject matter;

FIG. 3F provides a partial perspective view of a portion of an integral outer boundary structure and inner boundary structure of the combustion section and high pressure turbine section of FIG. 2 according to an exemplary embodiment of the present subject matter.

Figure 1:
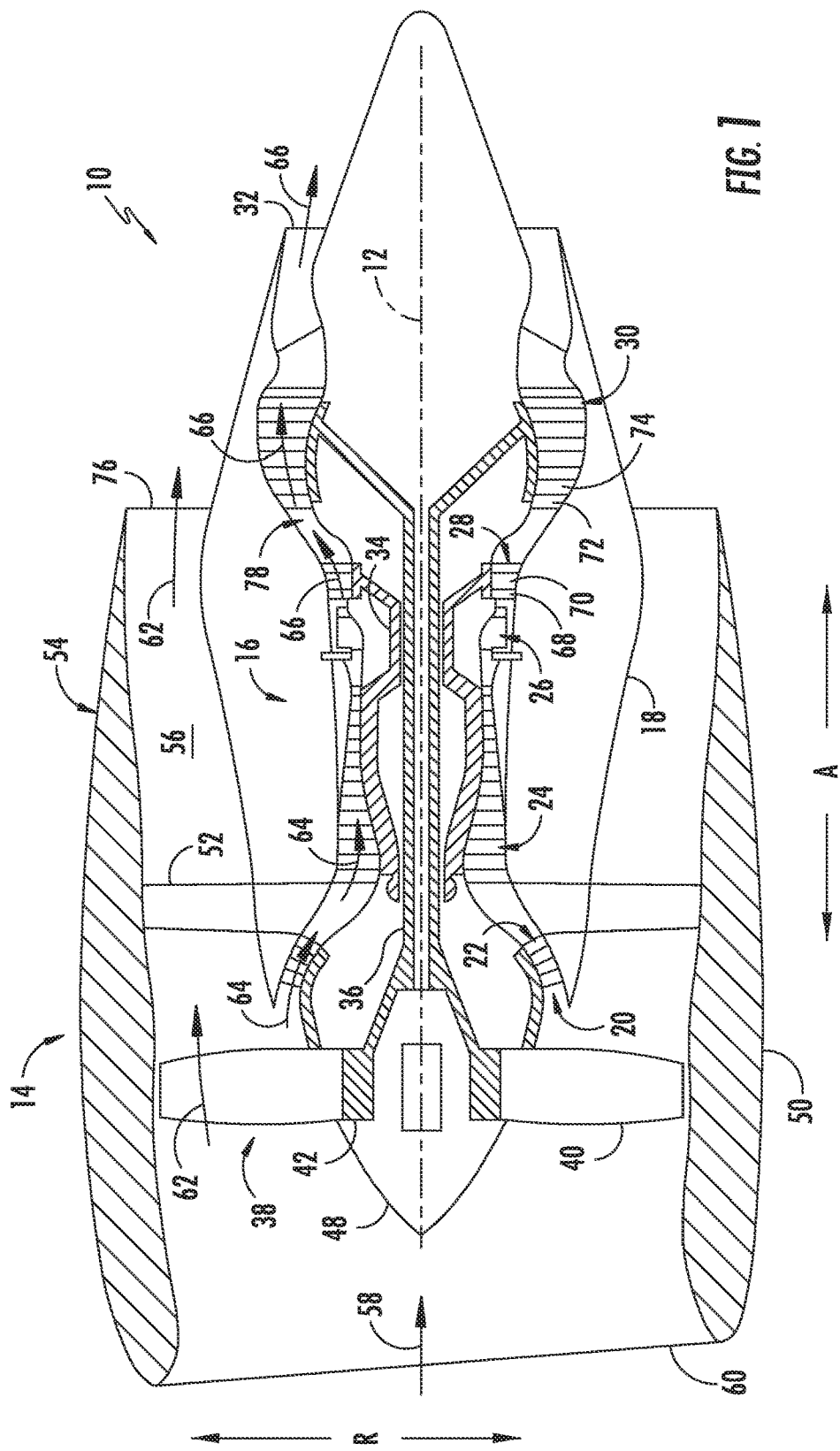
FIG. 1 provides a schematic cross-section view of an exemplary gas turbine engine according to various embodiments of the present subject matter.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Assemblies and methods are generally provided for securing a ceramic structure (e.g., a CMC structure) to a metal case so as to minimize the impact of the thermal expansion mismatch between the two materials. As such, the assemblies and methods described herein may allow positioning (e.g., centering) of the ceramic structure within the metal case through changes in relative size of the structures through heating and cooling cycles between the metal hardware and the CMC structure (such as a liner or nozzle band). Thus, these assemblies and methods may minimize the radial mismatch between the flowpath and hanger system, thereby simplifying the interface by avoiding complicated slip joints (such as hub and spoke), and reducing wear (caused by relative motion).

In particular, a mounting component may be utilized to position a ceramic structure within an outer casing (e.g., a metal outer casing). The mounting component may be made from at least two materials that transitions the coefficient of thermal expansion (CTE) of the mounting component from one end attached to the outer casing to the other end attached to the ceramic structure. For example, the mounting component can be formed from additive manufacturing with different materials (e.g., different metals and/or metal alloys) during the process so as to control the CTE along the length of the mounting component. As such, the mounting component can minimize the radial mismatch between a hanger system and a flowpath structure of an engine, thereby simplifying the interface by avoiding complicated slip joints (such as hub and spoke) and reducing wear (caused by relative motion).

Although described below with reference to the embodiments shown in the drawings, the present teachings are applicable to any mounting component spanning materials having different CTE characteristics, particularly suitable for a mounting component between a metal outer casing and a ceramic structure positioned therein.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32.

A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan engine 10, particularly components within hot gas path 78, such as components of combustion section 26, HP turbine 28, and/or LP turbine 30, may comprise a ceramic matrix composite (CMC) material, which is a non-metallic material having high temperature capability. Of course, other components of turbofan engine 10, such as components of HP compressor 24, may comprise a CMC material. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

As stated, components comprising a CMC material may be used within the hot gas path 78, such as within the combustion and/or turbine sections of engine 10. As an example, the combustion section 26 may include a combustor formed from a CMC material and/or one or more stages of the HP turbine 28 may be formed from a CMC material. However, CMC components may be used in other sections as well, such as the compressor and/or fan sections. Of course, in some embodiments, other high temperature materials and/or other composite materials may be used to form one or more components of engine 10.

Figure 3A:
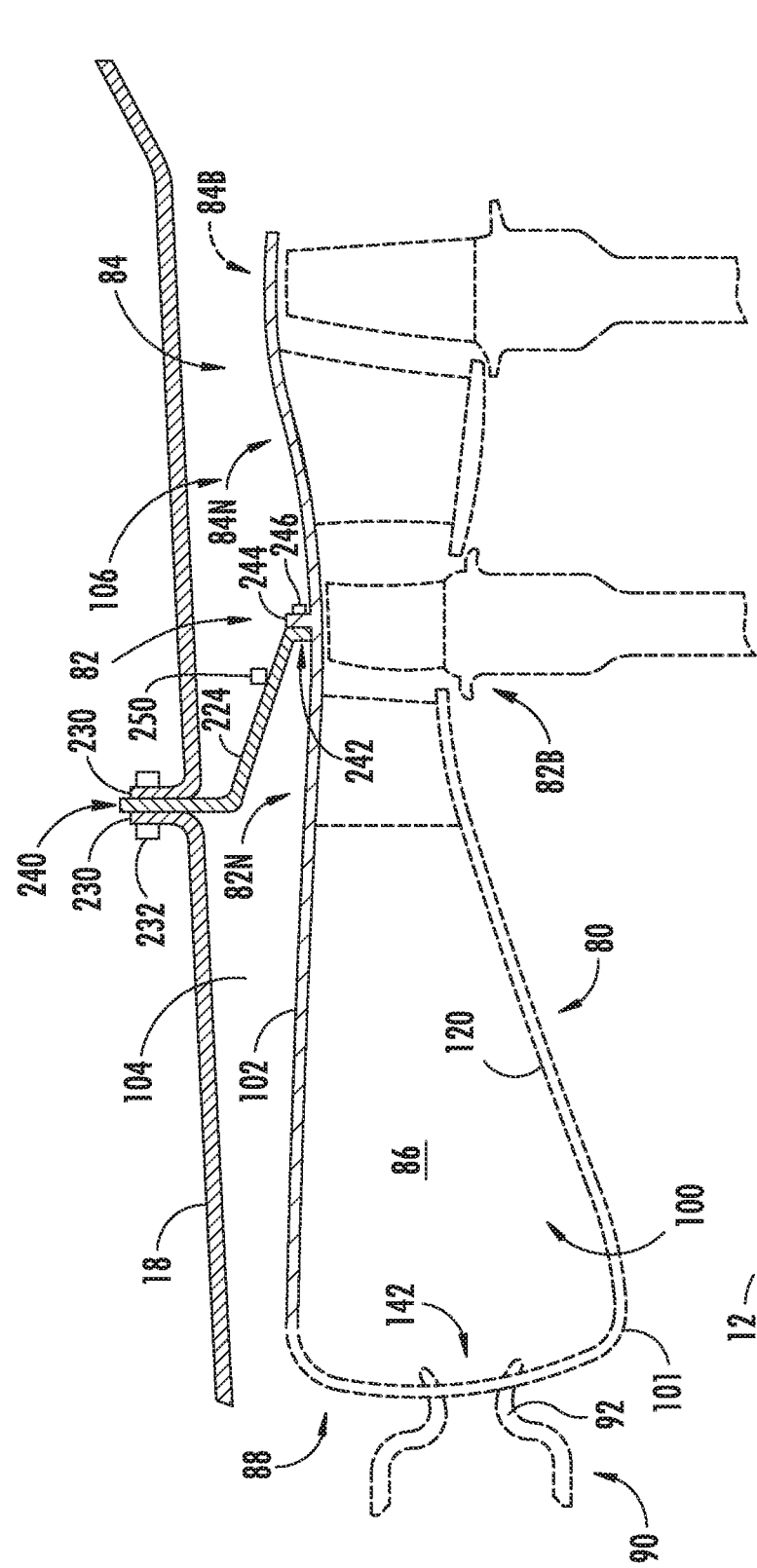
FIG. 3A provides a schematic cross-section view of the combustion section and high pressure turbine section of FIG. 2 according to an exemplary embodiment of the present subject matter.

FIG. 2 provides an exploded view of a schematic cross-section of the combustion section 26 and the HP turbine 28 of the turbine section of the turbofan engine 10 according to an exemplary embodiment of the present subject matter. FIG. 3A provides an unexploded schematic cross-sectional view of the combustion section 26 and the HP turbine 28 of FIG. 2 that focuses on an outer boundary of a flow path through the combustion section 26 and HP turbine 28. The depicted combustion section 26 includes a generally annular combustor 80, and downstream of the combustion section 26, the HP turbine 28 includes a plurality of turbine stages. More particularly, for the depicted embodiment, HP turbine 28 includes a first turbine stage 82 and a second turbine stage 84. In other embodiments, the HP turbine 28 may comprise a different number of turbine stages; for example, the HP turbine 28 may include one turbine stage or more than two turbine stages. The first turbine stage 82 is positioned immediately downstream of the combustion section 26, and the second turbine stage 84 is positioned immediately downstream of the first turbine stage 82. Further, each turbine stage 82, 84 comprises a nozzle portion and a blade portion; the first turbine stage 82 includes nozzle portion 82N and blade portion 82B, and the second turbine stage 84 includes nozzle portion 84N and blade portion 84B. The nozzle portion 82N of the first turbine stage 82 is located immediately downstream of the combustion section 26, such that the nozzle portion 82N of the first turbine stage 82 also may be referred to as a combustor discharge nozzle. Moreover, combustor 80 defines a generally annular combustion chamber 86 such that the combustor 80 may be described as a generally annular combustor.

Additionally, as described in greater detail below, a flow path 100 through the combustion section 26 and the HP turbine 28 is defined by an outer boundary and an inner boundary of a flow path assembly 101. The outer and inner boundaries form a flow path for the combustion gases 66 through the combustion section 26 and HP turbine 28; thus, the flow path 100 may comprise at least a portion of the hot gas path 78 described above. Further, in other embodiments, the flow path 100 also may extend through LP turbine 30 and jet exhaust 32; in still other embodiments, the flow path 100 also may extend forward upstream of the combustion section 26, e.g., into HP compressor 24. As such, it will be appreciated that the discussion herein of the present subject matter with respect to combustion section 26 and HP turbine 28 is by way of example only and also may apply to different configurations of gas turbine engines and flow paths 100.

As shown in the exploded view of FIG. 2, the outer and inner boundaries may be defined by an outer wall 102 and an inner wall 120, respectively, which may include several portions of the combustion section 26 and HP turbine 28. For instance, the combustor 80 includes an outer liner 108 defining an outer boundary of the flow path through the combustor 80. Each nozzle portion 82N, 84N comprises an outer band defining an outer boundary of a flow path through the nozzle portion of each turbine stage, and each blade portion 82B, 84B comprises a shroud defining an outer boundary of a flow path through the blade portion of each turbine stage. More particularly, as shown in FIG. 2, the first turbine stage nozzle portion 82N comprises outer band 110, first turbine stage blade portion 82B comprises shroud 112, second turbine stage nozzle portion 84N comprises outer band 114, and second turbine stage blade portion 84B comprises shroud 116. These portions of the combustion section 26 and HP turbine 28 may comprise at least a portion of the outer wall 102, as described in greater detail below.

Further, as illustrated in FIG. 2, the combustor 80 includes an inner liner 122 defining an inner boundary of the flow path through the combustor 80. Each nozzle portion 82N, 84N comprises an inner band defining an inner boundary of the flow path through the nozzle portion of each turbine stage, and each blade portion 82B, 84B comprises one or more blade platforms that define an inner boundary of the flow path through the blade portion of each turbine stage. More particularly, as shown in FIG. 2, the first turbine stage nozzle portion 82N comprises inner band 124, first turbine stage blade portion 82B comprises blade platforms 132, second turbine stage nozzle portion 84N comprises inner band 136, and second turbine stage blade portion 84B comprises blade platforms 132. These portions of the combustion section 26 and HP turbine 28 may comprise at least a portion of the inner wall 120, as described in greater detail below.

Moreover, in the depicted embodiment, a combustor dome 118 extends radially across a forward end 88 of the combustor 80. The combustor dome 118 may be a part of outer wall 102, may be a part of inner wall 120, may be a part of both outer wall 102 and inner wall 120 (e.g., a portion of the combustor dome 118 may be defined by the outer wall 102 and the remainder may be defined by the inner wall 120), or may be a separate component from outer wall 102 and inner wall 120. Additionally, a plurality of nozzle airfoils is positioned in each of the nozzle portions 82N, 84N. Each nozzle airfoil 126 within the first turbine stage nozzle portion 82N extends radially from the outer band 110 to the inner band 124, and the nozzle airfoils 126 are spaced circumferentially about the longitudinal centerline 12. Each nozzle airfoil 128 within the second turbine stage nozzle portion 84N extends radially from the outer band 114 to the inner band 136, and the nozzle airfoils 128 are spaced circumferentially about the longitudinal centerline 12. Further, a plurality of blade airfoils 130 are positioned in each of the blade portions 82B, 84B. Each blade airfoil 130 within the first turbine stage blade portion 82B is attached to blade platform 132, which in turn is attached to a first stage rotor 134. The blade airfoils 130 attached to the first stage rotor 134 are spaced circumferentially about the longitudinal centerline 12. Similarly, each blade airfoil 130 within the second turbine stage blade portion 84B is attached to a blade platform 132, which in turn is attached to a second stage rotor 138. The blade airfoils 130 attached to the second stage rotor 138 are spaced circumferentially about the longitudinal centerline 12. Each blade airfoils 130 extends radially outward toward the outer wall 102, i.e., the outer boundary of the flow path 100, and a clearance gap is defined between a radially outer tip 140 of each blade airfoil 130 and the outer wall 102 such that each turbine rotor 134, 138 is free to rotate within its respective turbine stage. Although not depicted, each turbine rotor 134, 138 of the HP turbine 28 is connected to the HP shaft 34 (FIG. 1). In such manner, rotor blade airfoils 130 may extract kinetic energy from the flow of combustion gases through the flow path 100 defined by the HP turbine 28 as rotational energy applied to the HP shaft 34.

Accordingly, flow path 100 through the combustion section 26 and the HP turbine 28 is defined by a flow path assembly 101 having an inner boundary and an outer boundary, and the inner and outer boundaries define the flow path for the combustion gases 66 through the combustion section 26 and HP turbine 28. Portions of the outer boundary of the flow path assembly 101 may be integrated or unified into a single piece outer wall 102 that defines the radially outer boundary of the gas flow path 100. For instance, the outer wall 102 may include a combustor portion 104 extending through a combustion section, such as combustion section 26, and a turbine portion 106 extending through at least a first turbine stage of a turbine section, such as first turbine stage 82 of HP turbine 28. The combustor portion 104 and turbine portion 106 are integrally formed such that the combustor portion and the turbine portion are a single unitary structure, i.e., a unitary outer wall 102.

In the exemplary embodiment depicted in FIG. 3A, the outer wall 102 includes a combustor portion 104 extending through the combustion section 26 and a turbine portion 106 extending through at least the first turbine stage 82 and the second turbine stage 84 of the turbine section. In other embodiments, the turbine portion 106 may extend through fewer stages (e.g., through one turbine stage as just described) or through more stages (e.g., through one or more stages of the LP turbine 30 positioned downstream of HP turbine 28). The combustor portion 104 and the turbine portion 106 are integrally formed such that the combustor portion 104 and the turbine portion 106 are a single unitary structure, which is referred to herein as unitary outer wall 102.

The term "unitary" as used herein denotes that the associated component, such as the outer wall 102, is made as a single piece during manufacturing, i.e., the final unitary component is a single piece. Thus, a unitary component has a construction in which the integrated portions are inseparable and is different from a component comprising a plurality of separate component pieces that have been joined together and, once joined, are referred to as a single component even though the component pieces remain distinct and the single component is not inseparable (i.e., the pieces may be re-separated). The final unitary component may comprise a substantially continuous piece of material, or in other embodiments, may comprise a plurality of portions that are permanently bonded to one another. In any event, the various portions forming a unitary component are integrated with one another such that the unitary component is a single piece with inseparable portions.

As shown in FIG. 3A, the combustor portion 104 of the unitary structure forming outer wall 102 includes the outer liner 108 of the combustor 80. The turbine portion 106 includes the outer band 110 of the first turbine stage nozzle portion 82N, the shroud 112 of the first turbine stage blade portion 82B, the outer band 114 of the second turbine stage nozzle portion 84N, and the shroud 116 of the second turbine stage blade portion 84B. As stated, these outer boundary components are integrated into a single piece to form the unitary structure that is outer wall 102. Thus, in the exemplary embodiment of FIG. 2, outer liner 108, outer band 110, shroud 112, outer band 114, and shroud 116 are integrally formed, i.e., constructed as a single unit or piece to form the integrated or unitary outer wall 102.

Figure 3B:
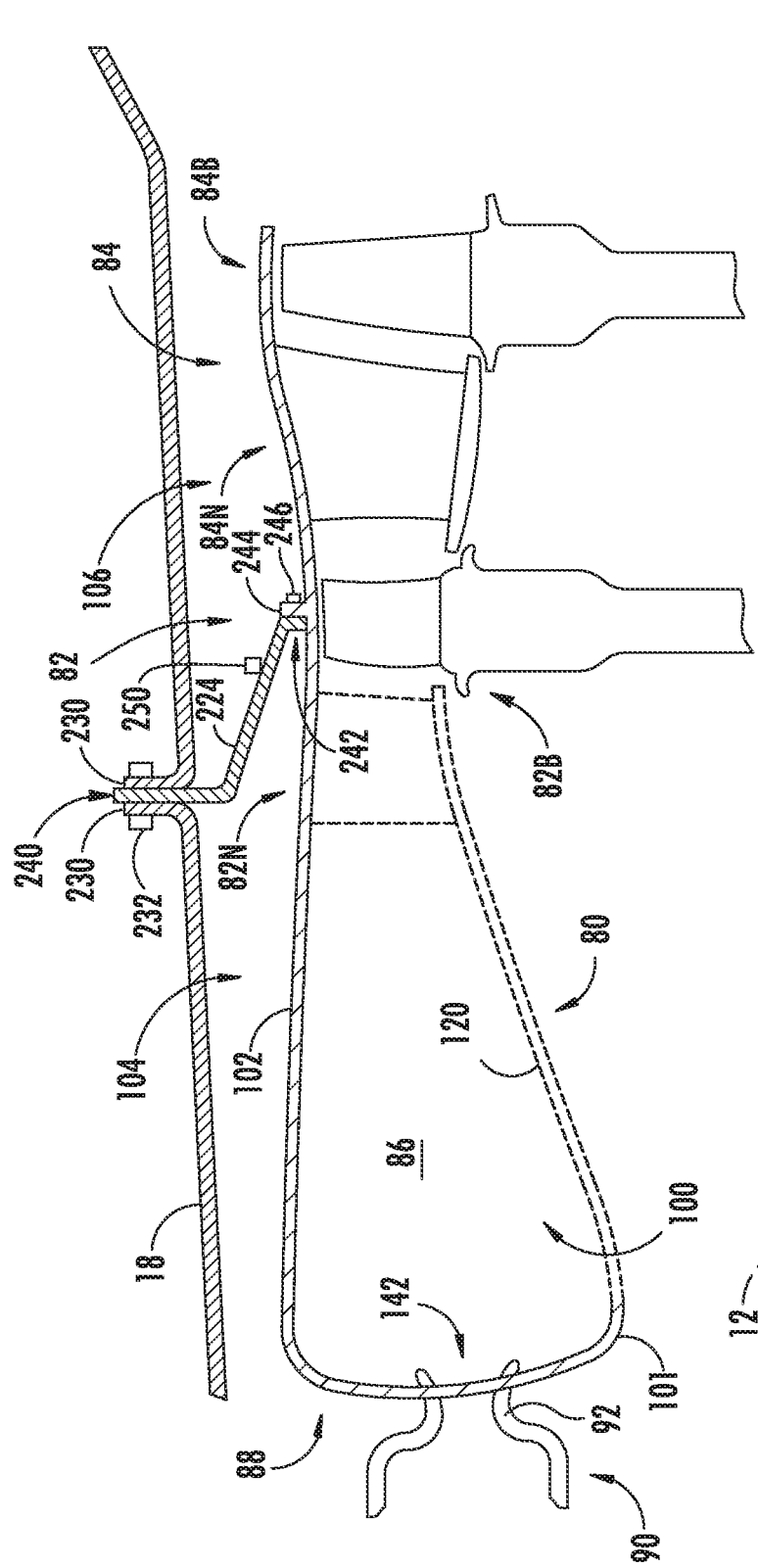

In some embodiments, other portions of the flow path assembly 101 may be integrated into the unitary structure of outer wall 102, and in still other embodiments, at least a portion of the outer boundary and the inner boundary are made as a single, unitary component such that the flow path assembly 101 may be referred to as an integrated flow path assembly. For example, referring to FIG. 3B, the combustor portion 104 of unitary outer wall 102 also may include the combustor dome 118 that extends across the forward end 88 of combustor 80. As such, in the exemplary embodiment of FIG. 3B, the outer liner 108, outer band 110, shroud 112, outer band 114, shroud 116, and combustor dome 118 are constructed as a single unit or piece to form the integrated or unitary outer wall 102. That is, the outer liner 108, outer bands 110, 114, shrouds 112, 116, and combustor dome 118 are integrally formed such that the outer liner 108, outer bands 110, 114, shrouds 112, 116, and combustor dome 118 are a single unitary structure.

Figure 3C:
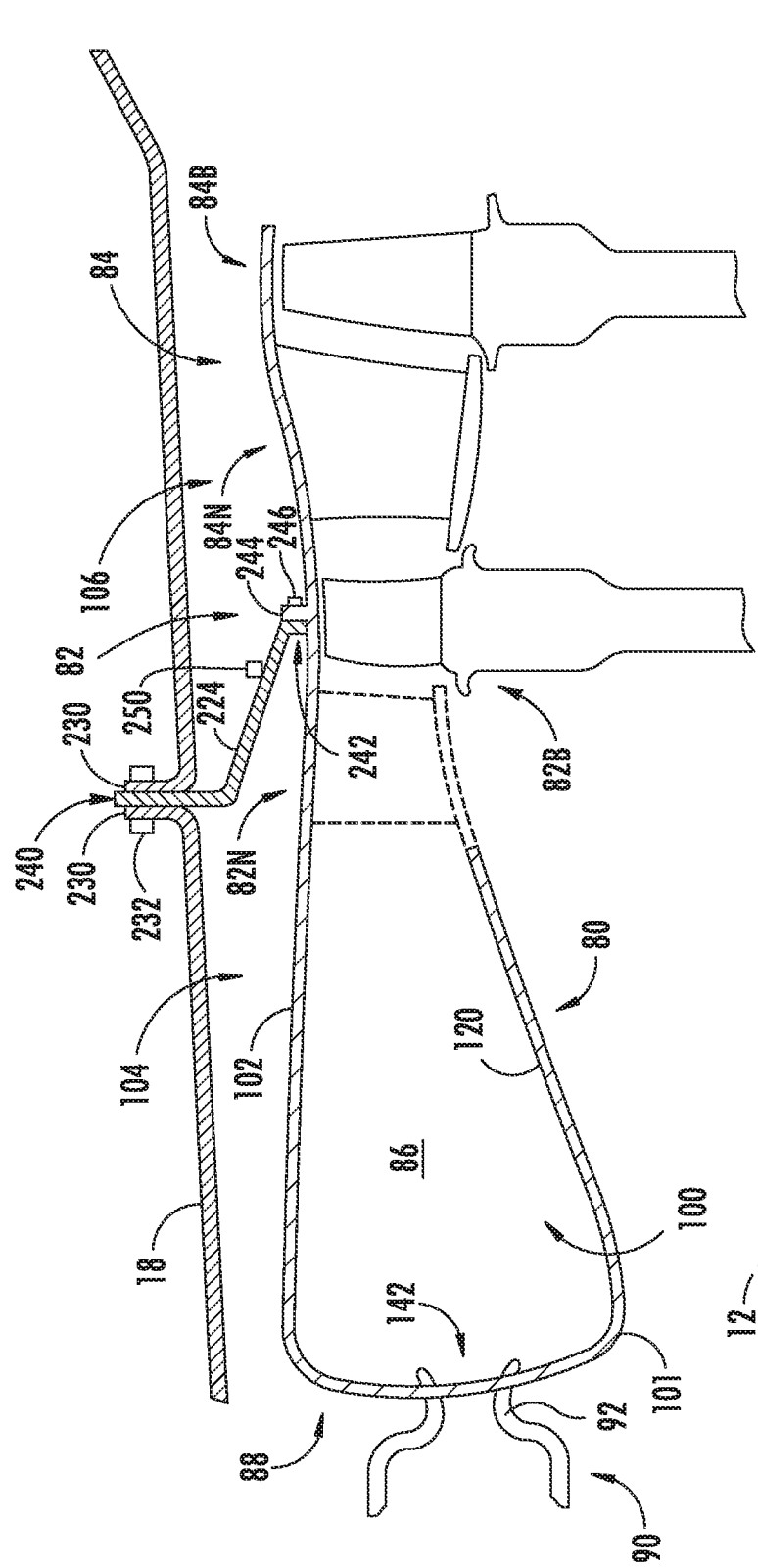
Figure 3D:
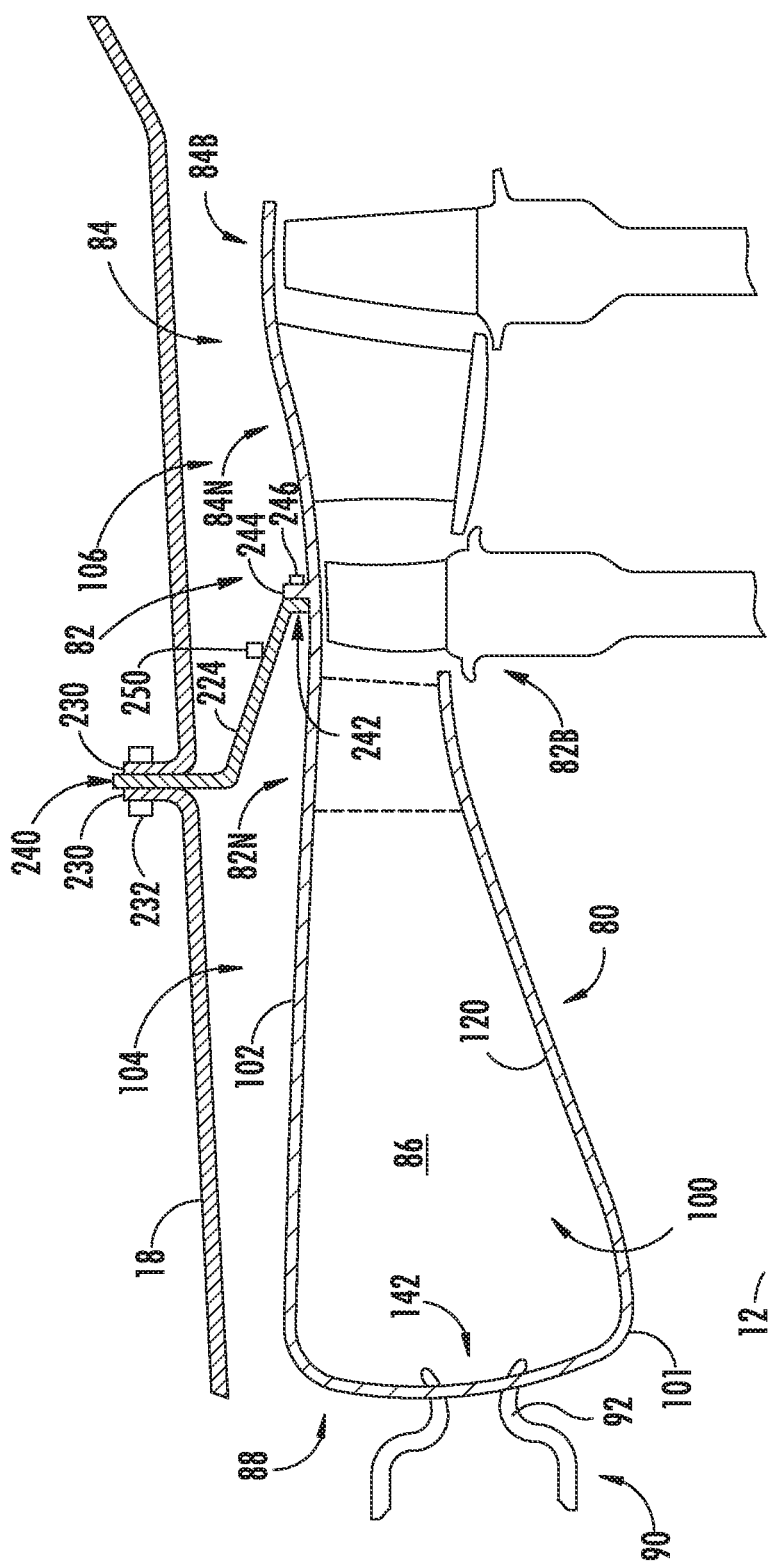

As another example, referring to FIG. 3C, at least a portion of the inner wall 120 defining the inner boundary of the flow path 100 may be integrated with the outer wall 102 to form an integrated flow path assembly 101. In the exemplary embodiment of FIG. 3C, the combustor portion 104 further comprises the inner liner 122, such that the inner liner 122 is integrated with the unitary structure of the outer wall 102 shown in FIG. 3B. Thus, the outer liner 108, outer band 110, shroud 112, outer band 114, shroud 116, combustor dome 118, and inner liner 122 are integrally formed such that the outer liner 108, outer bands 110, 114, shrouds 112, 116, combustor dome 118, and inner liner 122 are a single unitary structure. In the exemplary embodiment of FIG. 3D, the turbine portion 106 further includes the inner band 124 of the first turbine stage nozzle portion 82N, such that the inner band 124 is integrated with the unitary structure of the flow path assembly 101 shown in FIG. 3C. Accordingly, the outer liner 108, outer band 110, shroud 112, outer band 114, shroud 116, combustor dome 118, inner liner 122, and inner band 124 are integrally formed such that the outer liner 108, outer bands 110, 114, shrouds 112, 116, combustor dome 118, inner liner 122, and inner band 124 are a single unitary structure. In the exemplary embodiment of FIG. 3E, the turbine portion 106 further includes the plurality of nozzle airfoils 126, such that each nozzle airfoil 126 of the plurality of nozzle airfoils 126 of the first turbine stage nozzle portion 82N is integrated with the unitary structure of the flow path assembly 101 shown in FIG. 3D. Therefore, the outer liner 108, outer band 110, shroud 112, outer band 114, shroud 116, combustor dome 118, inner liner 122, inner band 124, and nozzle airfoils 126 are integrally formed such that the outer liner 108, outer bands 110, 114, shrouds 112, 116, combustor dome 118, inner liner 122, inner band 124, and nozzle airfoils 126 are a single unitary structure.

Of course, the nozzle airfoils 126 of the first turbine stage nozzle portion 82N may be integrated with the outer wall 102 without being integrated with the inner wall 120. For example, the plurality of nozzle airfoils 126 may be formed as a single unit or piece with the outer liner 108, outer band 110, shroud 112, outer band 114, shroud 116 such that the outer liner 108, outer bands 110, 114, shrouds 112, 116, and nozzle airfoils 126 are a single unitary structure, i.e., a unitary outer wall 102. In other embodiments, the unitary outer wall 102 also may include the combustor dome 118, such that the outer liner 108, outer band 110, shroud 112, outer band 114, shroud 116, combustor dome 118, and nozzle airfoils 126 are integrally formed or constructed as a single unit or piece. In still other embodiments, the inner liner 122 also may be included, such that the outer liner 108, outer band 110, shroud 112, outer band 114, shroud 116, combustor dome 118, inner liner 122, and nozzle airfoils 126 are integrally formed as a single unitary structure, i.e., a unitary outer wall 102.

As shown in each of FIGS. 3A, 3B, 3C, 3D, and 3E, a mounting component 224 is shown for positioning the flow path assembly 101. For example, a plurality of mounting components 224 may be utilized in a hub and spoke configuration, where the flow path assembly 101 is a hub, one or more mounting components 224 (i.e., the spokes) center and/or constrain the flow path assembly 101 in one or more directions while allowing for different thermal growth rates between different materials. As will be appreciated from the foregoing description of the gas turbine engine 10 and flow path assembly 101, a positioning system including one or more mounting component 224 may be used to position (e.g. center) the flow path assembly 101 within the outer casing 18 of the engine 10. Further, the positioning system may help position the flow path assembly 101 downstream of the compressor section 24 of the engine 10. Moreover, the positioning system may help position the flow path assembly 101 with respect to the one or more fuel nozzle assemblies 90 of the engine 10, e.g., such that the fuel nozzles are located at a proper depth with respect to the combustor 80. Additionally, as previously described, the flow path assembly 101 comprises a unitary outer wall 102, which at least forms a single piece outer boundary of the flow path 100 but also may integrate other portions of the flow path assembly 101. The unitary outer wall 102 extends through the combustion section 26 and at least the first turbine stage 82 of the HP turbine section 28 but also may extend through additional turbine stages. Thus, the mounting component 224 illustrated in FIGS. 3A-3E position the entire flow path assembly 101 within engine 10, rather than several separate pieces of a flow path through the combustion and turbine sections (such as separate outer and inner liners, outer and inner bands, shrouds, etc.). Accordingly, methods of positioning the flow path assembly 101 within the engine 10 include positioning the single piece outer boundary of the flow path assembly 101 using the one or more mounting component 224 as more fully described below.

FIG. 3F provides a partial perspective view of a portion of an integral flow path assembly 101, having an outer wall 102 and inner wall 120 formed as a single piece component. As described with respect to FIG. 3D and shown in FIG. 3F, in some embodiments of the combustion gas flow path assembly 101, the outer liner 108, outer band 110, shroud 112, outer band 114, shroud 116, combustor dome 118, inner liner 122, and inner band 124 are integrally formed such that the outer liner 108, outer bands 110, 114, shrouds 112, 116, combustor dome 118, inner liner 122, and inner band 124 are a single unitary structure. FIG. 3F further illustrates that a plurality of openings 142 for receipt of fuel nozzle assemblies 90 and/or swirlers 92 may be defined in the forward end 88 of combustor 80 of the unitary flow path assembly 101. Further, it will be appreciated that FIG. 3F illustrates only a portion of the integral flow path assembly 101 and that, although its entire circumference is not illustrated in FIG. 3F, the flow path assembly 101 is a single, unitary piece circumferentially as well as axially. As such, the integral flow path assembly 101 defines a generally annular, i.e., generally ring-shaped, flow path between the outer wall 102 and inner wall 120.

Integrating various components of the outer and inner boundaries of the flow path assembly 101 as described above can reduce the number of separate pieces or components within engine 10, as well as reduce the weight, leakage, and complexity of the engine 10, compared to known gas turbine engines. For instance, known gas turbine engines employ seals or sealing mechanisms at the interfaces between separate pieces of the flow path assembly to attempt to minimize leakage of combustion gases from the flow path. By integrating the outer boundary, for example, as described with respect to unitary outer wall 102, split points or interfaces between the outer combustor liner and first turbine stage outer band, the first turbine stage outer band and the first turbine stage shroud, etc. can be eliminated, thereby eliminating leakage points as well as seals or sealing mechanisms required to prevent leakage. Similarly, by integrating components of the inner boundary, split points or interfaces between the integrated inner boundary components are eliminated, thereby eliminating leakage points and seals or sealing mechanisms required at the inner boundary. Accordingly, undesired leakage, as well as unnecessary weight and complexity, can be avoided by utilizing unitary components in the flow path assembly. Other advantages of unitary outer wall 102, unitary inner wall 120, and/or a unitary flow path assembly 101 will be appreciated by those of ordinary skill in the art.

As illustrated in FIGS. 3A through 3F, the outer wall 102 and the inner wall 120 define a generally annular flow path therebetween. That is, the unitary outer wall 102 circumferentially surrounds the inner wall 120; stated differently, the unitary outer wall 102 is a single piece extending 360° degrees about the inner wall 120, thereby defining a generally annular or ring-shaped flow path therebetween. As such, the combustor dome 118, which extends across the forward end 88 of the combustor 80, is a generally annular combustor dome 118. Further, the combustor dome 118 defines an opening 142 for receipt of a fuel nozzle assembly 90 positioned at forward end 88. The fuel nozzle assembly 90, e.g., provides combustion chamber 86 with a mixture of fuel and compressed air from the compressor section, which is combusted within the combustion chamber 86 to generate a flow of combustion gases through the flow path 100. The fuel nozzle assembly 90 may attach to the combustor dome 118 or may "float" relative to the combustor dome 118 and the flow path 100, i.e., the fuel nozzle assembly 90 may not be attached to the combustor dome 118. In the illustrated embodiments, the fuel nozzle assembly 90 includes a swirler 92, and in some embodiments, the swirler 92 may attach to the combustor dome 118, but alternatively, the swirler 92 may float relative to the combustor dome 118 and flow path 100. It will be appreciated that the fuel nozzle assembly 90 or swirler 92 may float relative to the combustor dome 118 and flow path 100 along both a radial direction R and an axial direction A or only along one or the other of the radial and axial directions R, A. Further, it will be understood that the combustor dome 118 may define a plurality of openings 142, each opening receiving a swirler 92 or other portion of fuel nozzle assembly 90.

As further illustrated in FIGS. 3A through 3F, the flow path assembly 101 generally defines a converging-diverging flow path 100. More particularly, the outer wall 102 and the inner wall 120 define a generally annular combustion chamber 86, which forms a forward portion of the flow path 100. Moving aft or downstream of combustion chamber 86, the outer wall 102 and inner wall 120 converge toward one another, generally in the region of first turbine stage 82. Continuing downstream of the first turbine stage 82, the outer wall 102 and inner wall 120 then diverge, generally in the region of second turbine stage 84. The outer wall 102 and inner wall 120 may continue to diverge downstream of the second turbine stage 84. In exemplary embodiments, e.g., as shown in FIG. 3A and referring only to the unitary outer wall 102, the first turbine stage nozzle outer band portion 110 and blade shroud portion 112 of the outer wall 102 converge toward the axial centerline 12. The second turbine stage nozzle outer band portion 114 and blade shroud portion 116 of the outer wall 102 diverge away from the axial centerline 12. As such, the outer boundary of flow path 100 formed by the unitary outer wall 102 defines a converging-diverging flow path 100.

In the embodiments shown in FIGS. 3A-3E, the mounting component 224 is attached on a first end 240 to the outer casing 18. For example, the first end 240 may be attached to at least one attachment flange 230 extending from the outer casing 18, such as utilizing a pin 232 (or other attachment mechanism, such as a bolt, screw, etc.).

On a second end 242, the mounting component 224 is attached to a ceramic structure (i.e., the outer wall 102 forming at least a portion of the outer boundary of the flow path through the combustor chamber 86). In the shown embodiment, the ceramic structure is a unitary outer wall 102 that includes a combustor portion extending through the combustion section 26 of the gas turbine engine 16 and the HP turbine portion 28 extending through at least a first turbine stage 82 of a turbine section. In this embodiment, the combustor portion 26 and the turbine portion 28 are integrally formed as a single unitary structure 102.

In one embodiment, the mounting component 224 is constructed such that the coefficient of thermal expansion is different at the first end 240 than the second end 242. For example, the mounting component 224 may be constructed from at least two materials transitioning from the first end 240 to the second end 242. Such a compositional transition can be formed, for example, via additive manufacturing of the mounting component 224 with different materials at the first end 240 and the second end 242. For example, the first end 240 may include a first metal (e.g., a nickel-based alloy, such as a nickel-based super alloy), while the second end includes a second metal (e.g., a tungsten-based alloy, such as a tungsten-based super alloy). Alternatively, iron based alloys and super alloys may be included in as the first metal and/or the second metal. The compositional transition can be gradual or stepped in change. Additionally, the compositional transition may be along the entire length of the mounting component 224 or within a transitional region between the first end 240 to the second end 242.

In one particular embodiment, the mounting component 224 has a coefficient of thermal expansion at the first end 240 that is greater than the coefficient of thermal expansion at the second end 242, which is particularly suitable for attaching a metal component to the first end 240 and a ceramic component to the second end 242.

In one particular embodiment, the mounting component 224 may have a coefficient of thermal expansion (CTE) at the first end 240 that is within about 50% of the coefficient of thermal expansion of the outer casing 18, such as within about 25% (e.g., within about 10%). Conversely, the CTE matching of a metal material to the CTE of a CMC component is more difficult. For example, the mounting component 224 may have a coefficient of thermal expansion at the second end 242 within about 300% of the coefficient of thermal expansion of the outer wall 102, such as within about 200% (e.g., within about 50%). These comparisons of the respective CTEs may be made at any temperature, such as at room temperature or at operating temperatures.

However, at more elevated temperatures, the respective CTEs may be more similar, especially with respect to the second end 242 and the outer wall 102. For example, at about 537.78° C. (i.e., about 1000° F.), the mounting component 224 may have a coefficient of thermal expansion at the second end 242 within about 50% of the coefficient of thermal expansion of the outer wall 102, such as within about 25% of the coefficient of thermal expansion of the outer wall 102.

In the embodiments shown in FIGS. 3A-3E, the mounting component 224 is attached on the second end 242 to at least one attachment flange 244 extending from the outer wall 102, such as utilizing a pin 246 or other attachment mechanism (e.g., a bolt, screw, etc.). However, any suitable attachment may be formed by the second end 242 of the mounting component 224 to the outer wall 102.

Figure 4:
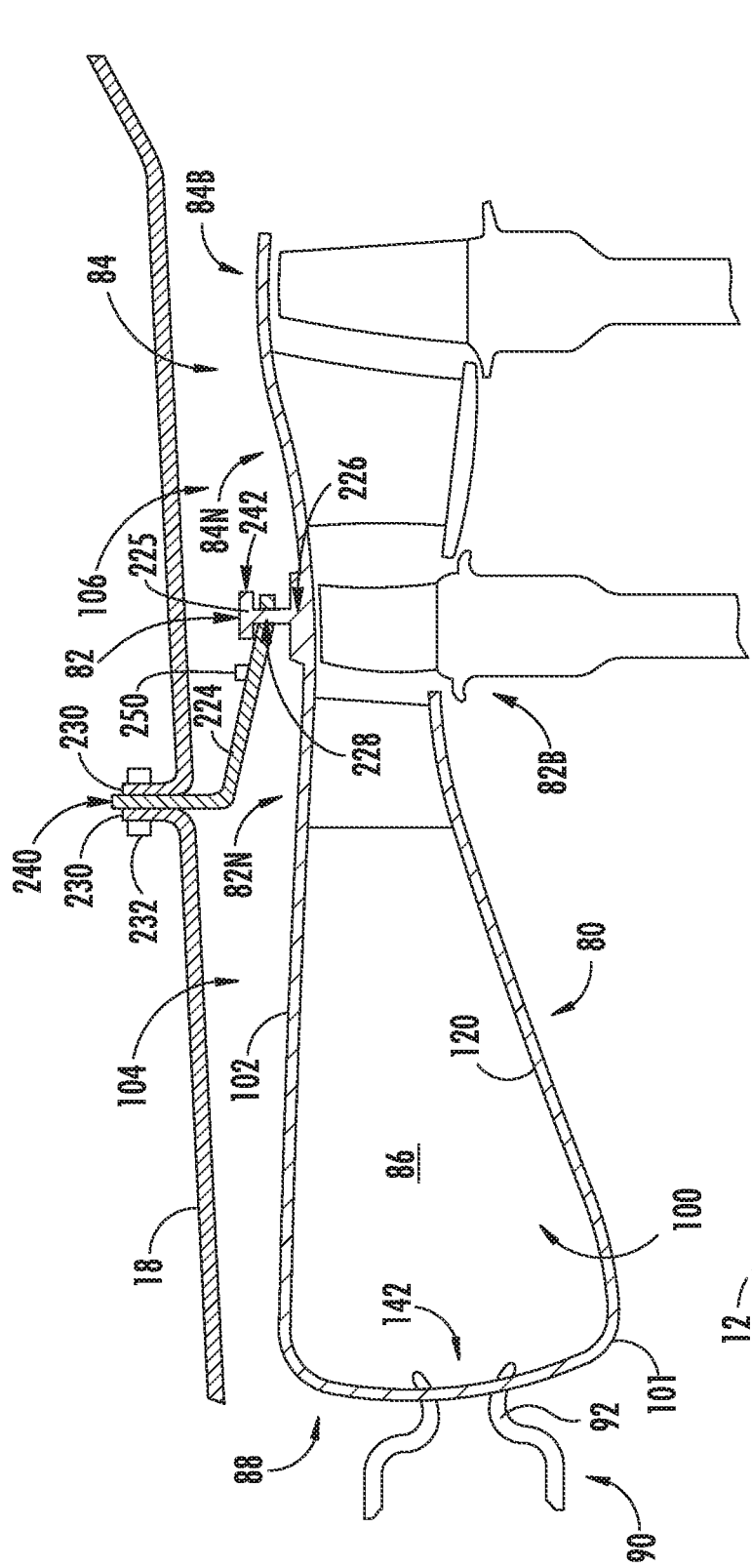
FIG. 4 provides a cross-sectional view of a flow path assembly according to an exemplary embodiment of the present subject matter.

For example, FIG. 4 shows an embodiment wherein the mounting component 224 is connected to a hanger 225 that extends into an opening 226 defined in the first turbine stage shroud portion 82B of the outer wall 102. A slot 228 is defined in the mounting component 224, through which the hangers 225 are inserted. It is to be appreciated that the hanger 225 depicted in FIG. 4 is by way of example only. Also as illustrated in FIG. 4, the outer wall 102 is built up, or has an increased thickness, in the area of the first turbine stage shroud portion 82B (i.e., portion 112 of FIG. 2) of the outer wall 102, which is above the first turbine stage blades, so as to receive the hanger 225. As shown, the hanger 225 is positioned over the blade portion of the first turbine stage 82B.

The flow path assembly 101, or at least the outer wall 102 and inner wall 120, may be made from a CMC material while the mounting components 204, 224 and other components of the engine 10 are metallic components, such that the CMC components have a different rate of thermal expansion than the metallic components. During operation of the engine 10, the metallic components generally thermally expand more than the CMC components, which may affect the position of the flow path assembly 101 within the engine 10. Using any of the systems illustrated in FIG. 3A-3E or 4, any distortion of the flow path assembly 101 or surrounding structures that results from, e.g., thermal expansion or the like may be controlled in the area of the blade portion 82B so as to control expansion in the radial direction R to help preserve the clearance gap G between the blade tips 140 and the outer wall 102. Such a positioning may impact the performance of the engine 10 more so than other portions of the flow path assembly 101.

Further, as illustrated in FIG. 4, the slot(s) 228 in the mounting component 224 may be sized to allow for some axial movement of the hangers 225 within the slot(s) 228, e.g., to account for some variation in part positioning along the axial direction A or to allow for axial thermal expansion. However, the mounting component 224 may constrain the flow path assembly 101 radially, tangentially, and axially by bolting the inner wall 120 to the hanger 225. In other embodiments, the mounting component 224 may allow some relative movement of the flow path assembly 101, e.g., to properly position the flow path assembly 101 within the engine 10 or to compensate for thermal expansion of various components during engine operation.

In addition to or alternatively with the mounting structure(s), a ring 250 may surround the outer wall 102 (i.e., the ceramic structure) and be positioned adjacent to the mounting component 224 so as to mechanically restrain radial thermal growth of the mounting component 224 towards the second end 242. The ring 250 may have a coefficient of thermal expansion that is within about 10% of the coefficient of thermal expansion of the outer wall 102, such as within about 5% (e.g., within about 1%). In one particular embodiment, the ring 250 comprises a ceramic material (e.g., having substantially the same composition as the ceramic material of the outer wall 102).

As previously stated, the outer wall 102, inner wall 120, and combustor dome 118, and in some embodiments, first and second turbine stage nozzle airfoils 126, 128, may comprise a CMC material. More particularly, in exemplary embodiments, the combustor portion 104 and the turbine portion 106 of flow path assembly 101 are integrally formed from a CMC material such that the resulting unitary structure is a CMC component. For example, where the combustor portion 104 includes the outer liner 108 of the combustor 80 and the turbine portion 106 includes the outer band 110 of the first turbine stage nozzle portion 82N, the shroud 112 of the first turbine stage blade portion 82B, the outer band 114 of the second turbine stage nozzle portion 84N, and the shroud 116 of the second turbine stage blade portion 84B, the outer liner 108, outer bands 110, 114, and shrouds 114, 116 may be integrally formed from a CMC material to produce a unitary CMC outer wall 102. As described above, in other embodiments, additional CMC components may be integrally formed with the outer liner 108, outer bands 110, 114, and shrouds 114, 116 to construct a unitary CMC outer wall 102. Similarly, the inner wall 120 may be formed from a CMC material. For instance, where the inner wall 120 comprises separate components, e.g., inner liner 122, inner bands 124, 136, and blade platforms 132, each component of the inner wall 120 may be formed from a CMC material. In embodiments in which two or more components are integrated to form a unitary inner wall 120, the components may be integrally formed from a CMC material to construct a unitary CMC inner wall 120.

Examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol (C4H3OCH2OH). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as, e.g., the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Thus, a variety of processes may be used to form a unitary structure, such as the outer wall 102 depicted in FIG. 3A, as a unitary CMC component. More specifically, a plurality of plies of a CMC material may be used to form each unitary structure. The plurality of plies may be interspersed with one another to integrate the various portions forming the unitary structure. As an example, the unitary outer wall 102 of FIG. 3A may be made from a plurality of outer liner plies, a plurality of first turbine stage outer band plies, a plurality of first turbine stage shroud plies, a plurality of second turbine stage outer band plies, and a plurality of second turbine stage shroud plies. Where the outer liner plies meet the first turbine stage outer band plies, ends of the outer liner plies may be alternated with ends of the outer band plies to integrate the plies for forming the outer liner portion with the plies for forming the first turbine stage outer band portion of the unitary outer wall 102. That is, any joints between the plies forming unitary outer wall 102 may be formed by alternating plies on one side of the joint with plies on the other side of the joint. As such, the plies for forming unitary outer wall 102 may be interspersed to integrate the plies and, thereby, each portion of the unitary outer wall 102. Of course, the CMC plies may be laid up in other ways as well to form the unitary structure. In addition, laying up the plurality of CMC plies may include defining features of the unitary structure or other component (e.g., inner liner 122 when not integrated with inner band 124 to from a unitary inner wall 120 or separate combustor dome 118).

After the plurality of CMC plies are laid up to define a unitary CMC component preform, the preform is cured to produce a single piece, unitary CMC component, which is then fired and subjected to densification, e.g., silicon melt-infiltration, to form a final unitary CMC structure. Continuing with the above outer wall 102 example, the outer wall preform may be processed in an autoclave to produce a green state unitary outer wall 102. Then, the green state unitary outer wall 102 may be placed in a furnace to burn out excess binders or the like and then placed in a furnace with a piece or slab of silicon and fired to melt infiltrate the unitary outer wall 102 with at least silicon. More particularly, for unitary outer wall 102 formed from CMC plies of prepreg tapes that are produced as described above, heating (i.e., firing) the green state component in a vacuum or inert atmosphere decomposes the binders, removes the solvents, and converts the precursor to the desired ceramic matrix material. The decomposition of the binders results in a porous CMC body; the body may undergo densification, e.g., melt infiltration (MI), to fill the porosity. In the foregoing example where the green state unitary outer wall 102 is fired with silicon, the outer wall 102 undergoes silicon melt-infiltration. However, densification may be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In one embodiment, densification and firing may be conducted in a vacuum furnace or an inert atmosphere having an established atmosphere at temperatures above 1200° C. to allow silicon or other appropriate material or combination of materials to melt-infiltrate into the component. The densified CMC body hardens to a final unitary CMC outer wall 102. In some embodiments, the final unitary structure may be finish machined, e.g., to bring the structure within tolerance or to define openings, for example opening in the forward end 88 of the combustor 80 or openings for the turbine nozzles 82N, 84N. Also, an environmental barrier coating (EBC) may be applied to the unitary structure, e.g., to protect the unitary structure from the hot combustion gases. It will be appreciated that other methods or processes of forming CMC components, such as unitary CMC outer wall 102, unitary CMC inner wall 120, or the like may be used as well.

Additionally or alternatively, other processes for producing unitary components may be used to form unitary outer wall 102 and/or unitary inner wall 120, and the unitary structure(s) may be formed from other materials. In some embodiments, an additive manufacturing process may be used to form unitary outer wall 102 and/or unitary inner wall 120. For example, an additive process such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering or other known process may be used to produce a unitary outer wall 102 and/or a unitary inner wall 120. Generally, an additive process fabricates components using three-dimensional information, for example, a three-dimensional computer model, of the component. The three-dimensional information is converted into a plurality of slices, each slice defining a cross section of the component for a predetermined height of the slice. The component is then "built-up" slice by slice, or layer by layer, until finished. Superalloy metallic materials or other suitable materials may be used in an additive process to form unitary outer wall 102 and/or a unitary inner wall 120. In other embodiments, a unitary outer wall 102 and/or unitary inner wall 120 may be formed using a forging or casting process. Other suitable processes or methods may be used as well.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A flow path assembly of a gas turbine engine, the flow path assembly comprising:
   a unitary outer wall including a combustor portion extending through a combustion section of the gas turbine engine and a turbine portion extending through at least a first turbine stage and a second turbine stage of a turbine section of the gas turbine engine,
   wherein the turbine portion comprises
      an outer band of a nozzle portion of the first turbine stage,
      a shroud of a blade portion of the first turbine stage,
      an outer band of a nozzle portion of the second turbine stage, and
      a shroud of a blade portion of the second turbine stage, and
   the combustor portion and the turbine portion being integrally formed as a single unitary ceramic structure;
   an outer casing comprising a metal material having a first coefficient of thermal expansion;
   the single unitary ceramic structure comprising a ceramic material having a second coefficient of thermal expansion; and
   a mounting component having a first end of a third coefficient of thermal expansion attached to the outer casing and having a second end of a fourth coefficient of thermal expansion attached to the single unitary ceramic structure, wherein the mounting component is constructed from at least two different materials transitioning from the first end to the second end such that the third coefficient of thermal expansion is different from the fourth coefficient of thermal expansion.

2. The flow path assembly as in claim 1, wherein the third coefficient of thermal expansion is within 50% of the first coefficient of thermal expansion, and wherein the fourth coefficient of thermal expansion is within 300% of the second coefficient of thermal expansion.

3. The flow path assembly as in claim 1, wherein the first coefficient of thermal expansion is greater than the second coefficient of thermal expansion.

4. The flow path assembly as in claim 1, wherein the at least two different materials comprise at least two different metal alloys.

5. The flow path assembly as in claim 1, wherein the at least two different materials comprise a first metal at the first end and a second metal at the second end.

6. The flow path assembly as in claim 5, wherein the first metal comprises a nickel-based alloy or an iron-based alloy, and wherein the second metal comprises a tungsten-based alloy or an iron-based alloy, the first metal having a different composition than the second metal.

7. The flow path assembly as in claim 1, wherein the third coefficient of thermal expansion is within 25% of the first coefficient of thermal expansion, and wherein the fourth coefficient of thermal expansion is within 25% of the second coefficient of thermal expansion.

8. The flow path assembly as in claim 1, wherein the third coefficient of thermal expansion is within 10% of the first coefficient of thermal expansion, and wherein the fourth coefficient of thermal expansion is within 200% of the second coefficient of thermal expansion.

9. The flow path assembly as in claim 1, wherein the ceramic material comprises a ceramic matrix composite.

10. The flow path assembly as in claim 1, further comprising: a ring surrounding the single unitary ceramic structure and positioned adjacent to the mounting component so as to mechanically restrain radial thermal growth of the mounting component at the second end.

11. The flow path assembly as in claim 10, wherein the ring comprises a material having a fifth coefficient of thermal expansion that is within 10% of the second coefficient of thermal expansion.

12. A flow path assembly of a gas turbine engine, the flow path assembly comprising:
   a unitary outer wall including a combustor portion extending through a combustion section of the gas turbine engine and a turbine portion extending through at least a first turbine stage and a second turbine stage of a turbine section of the gas turbine engine,
   wherein the turbine portion comprises
      an outer band of a nozzle portion of the first turbine stage,
      a shroud of a blade portion of the first turbine stage,
      an outer band of a nozzle portion of the second turbine stage, and
      a shroud of a blade portion of the second turbine stage, and
   the combustor portion and the turbine portion being integrally formed as a single unitary ceramic structure;
   an outer casing comprising a metal material having a first coefficient of thermal expansion;
   the single unitary ceramic structure comprising a ceramic material having a second coefficient of thermal expansion;
   a mounting component having a first end attached to the outer casing and having a second end attached to the single unitary ceramic structure; and
   a ring surrounding the single unitary ceramic structure and positioned adjacent to the mounting component so as to mechanically restrain radial thermal growth of the mounting component at the second end, wherein the ring has a third coefficient of thermal expansion within 10% of the second coefficient of thermal expansion.

13. The flow path assembly as in claim 12, wherein the third coefficient of thermal expansion is within 1% of the second coefficient of thermal expansion.

14. The flow path assembly as in claim 12, wherein the ring comprises another ceramic material.

15. The flow path assembly as in claim 12, wherein the ring comprises the ceramic material having the second coefficient of thermal expansion of the single unitary ceramic structure.

16. The flow path assembly as in claim 12, further comprising: at least one additional mounting component attached on a first end to the outer casing and attached on a second end to the single unitary ceramic structure to center the single unitary ceramic structure within the outer casing.

17. A flow path assembly of a gas turbine engine, the flow path assembly comprising:
   a unitary outer wall including a combustor portion extending through a combustion section of the gas turbine engine and a turbine portion extending through at least a first turbine stage and a second turbine stage of a turbine section of the gas turbine engine,
   wherein the turbine portion comprises
      an outer band of a nozzle portion of the first turbine stage,
      a shroud of a blade portion of the first turbine stage,
      an outer band of a nozzle portion of the second turbine stage, and
      a shroud of a blade portion of the second turbine stage, and
   the combustor portion and the turbine portion being integrally formed as a single unitary structure;
   an outer casing comprising a metal material having a first coefficient of thermal expansion;
   the single unitary structure comprising a ceramic matrix composite material having a second coefficient of thermal expansion; and
   a mounting component having a first end of a third coefficient of thermal expansion attached to the outer casing and having a second end of a fourth coefficient of thermal expansion attached to the single unitary structure, wherein the mounting component comprises at least two different metal materials transitioning from a first metal at the first end to a second metal at the second end such that the third coefficient of thermal expansion is higher than the fourth coefficient of thermal expansion.

18. The flow path assembly as in claim 17, wherein the first metal comprises a nickel-based alloy or an iron-based alloy, and wherein the second metal comprises a tungsten-based alloy or an iron-based alloy, the first metal having a different composition than the second metal.

* * * * *